(12) United States Patent
Nicolls

(10) Patent No.: US 10,698,099 B2
(45) Date of Patent: Jun. 30, 2020

(54) RANDOMIZED PHASE AND AMPLITUDE RADAR CODES FOR SPACE OBJECT TRACKING

(71) Applicant: LEOLABS, INC., Menlo Park, CA (US)

(72) Inventor: Michael Nicolls, Portola Valley, CA (US)

(73) Assignee: LeoLabs, Inc., Menlo Park, CA (US)

(*) Notice: Subject to any disclaimer, the term of this patent is extended or adjusted under 35 U.S.C. 154(b) by 253 days.

(21) Appl. No.: 15/787,475

(22) Filed: Oct. 18, 2017

(65) Prior Publication Data

US 2019/0113611 A1 Apr. 18, 2019

(51) Int. Cl.
*G01S 13/72* (2006.01)
*G01S 13/28* (2006.01)
(Continued)

(52) U.S. Cl.
CPC .......... *G01S 13/726* (2013.01); *G01S 13/288* (2013.01); *G01S 7/2806* (2013.01); *G01S 13/106* (2013.01);
(Continued)

(58) Field of Classification Search
CPC ........ G01S 1/02; G01S 13/222; G01S 13/106; G01S 2013/0254; G01S 7/2921;
(Continued)

(56) References Cited

U.S. PATENT DOCUMENTS 2,969,542 A 1/1961 Coleman et al.
3,612,845 A * 10/1971 Lawlor ...................... G06F 7/70
708/101
(Continued)

FOREIGN PATENT DOCUMENTS

EP 0919835 A2 * 6/1999 ........... G01S 13/222
EP 2137789 5/2013
(Continued)

OTHER PUBLICATIONS

International Search Report and Written Opinion, PCT/US2018/055812, dated Jan. 3, 2019 7 pp.
(Continued)

*Primary Examiner* — Olumide Ajibade Akonai
(74) *Attorney, Agent, or Firm* — Dentons US LLP

(57) ABSTRACT

A method of tracking objects using a radar, includes sending a beamcode to at least one radar antenna to set a predetermined direction, using samples from a random distribution of at least one of a phase or an amplitude to generate a tracking signal pulse train, transmitting the pulse train from the at least one antenna within a pulse time window, receiving return signals from objects at the at least one antenna, and using the return signals to gather data to track the objects. A radar system has at least one radar antenna to transmit a tracking signal, a memory to store a set of random distributions, a controller connected to at least one radar antenna and the memory, the controller to execute instructions to determine which random distribution to use, generate a pulse train using the random distribution, transmit the pulse train to the at least one radar antenna as the tracking signal, and gather measurement data about objects returning signals from the tracking signal.

16 Claims, 6 Drawing Sheets

(51) Int. Cl.
*G01S 7/28* (2006.01)
*G01S 13/02* (2006.01)
*G01S 13/10* (2006.01)
*G01S 13/22* (2006.01)

(52) U.S. Cl.
CPC ..... *G01S 13/222* (2013.01); *G01S 2013/0254* (2013.01)

(58) Field of Classification Search
CPC ........ G01S 7/292; G01S 13/003; G01S 13/26; G01S 13/284; G01S 13/726; G01S 7/282
See application file for complete search history.

(56) References Cited

U.S. PATENT DOCUMENTS

| | | | |
|---|---|---|---|
| 4,769,777 A * | 9/1988 | Bittle | H03K 3/84 |
| | | | 708/251 |
| 5,115,246 A | 5/1992 | Thomas, Jr. et al. | |
| 5,130,718 A | 7/1992 | Wu et al. | |
| 5,570,307 A * | 10/1996 | Takahashi | G06F 1/02 |
| | | | 331/78 |
| 5,748,140 A | 5/1998 | Schober | |
| 5,900,844 A | 5/1999 | Hill | |
| 6,169,522 B1 | 1/2001 | Ma et al. | |
| 6,271,786 B1 | 8/2001 | Huff et al. | |
| 6,320,553 B1 | 11/2001 | Ergene | |
| 6,456,231 B1 * | 9/2002 | McEwan | G01S 7/2927 |
| | | | 342/159 |
| 6,522,210 B1 * | 2/2003 | Dvorak | H03K 3/84 |
| | | | 331/46 |
| 6,664,939 B1 | 12/2003 | Olinyk et al. | |
| 6,862,605 B2 * | 3/2005 | Wilber | G06F 7/588 |
| | | | 708/251 |
| 6,914,554 B1 | 7/2005 | Riley et al. | |
| 6,933,888 B1 | 8/2005 | Schiffmiller et al. | |
| 6,965,351 B1 | 11/2005 | Miller et al. | |
| 7,375,676 B1 | 5/2008 | Loberger | |
| 8,860,605 B2 * | 10/2014 | Lellouch | G01S 7/003 |
| | | | 342/107 |
| 2003/0083063 A1 | 5/2003 | Wang et al. | |
| 2004/0259497 A1 | 12/2004 | Dent | |
| 2006/0132354 A1 | 6/2006 | Beard et al. | |
| 2007/0018882 A1 * | 1/2007 | Manoogian | G01S 13/4418 |
| | | | 342/80 |
| 2009/0066561 A1 * | 3/2009 | Yoshimura | G01S 7/023 |
| | | | 342/175 |
| 2013/0147658 A1 | 6/2013 | Burri et al. | |
| 2014/0225796 A1 | 8/2014 | Chen et al. | |
| 2015/0279103 A1 | 10/2015 | Naegle et al. | |
| 2016/0161604 A1 | 6/2016 | Clark | |

FOREIGN PATENT DOCUMENTS

| | | |
|---|---|---|
| EP | 2637253 | 9/2013 |
| WO | WO2002031915 | 4/2002 |
| WO | WO2008114246 | 9/2008 |
| WO | WO2016164758 | 10/2016 |

OTHER PUBLICATIONS

Australia Office Action dated Oct. 7, 2019 for Serial No. 2016246770 filed Apr. 8, 2016 (5 pages).

Europe Supplementary Search Report dated Sep. 12, 2018 for Serial No. 16777378.7 filed Apr. 8, 2016 (10 pages).

International Search Report and Written Opinion dated Aug. 30, 2016 for Application No. PCT/2016/026697 filed Apr. 8, 2016 (11 pages).

Rahmat-Samii et al., Advanced precipitation Radar antenna: array-fed offset membrane cylindrical reflector antenna, IEEE Transactions on Antennas and Propagation., vol. 53, No. 8, Aug. 2005, pp. 2503-2515.

* cited by examiner

RANDOMIZED PHASE AND AMPLITUDE RADAR CODES FOR SPACE OBJECT TRACKING

BACKGROUND

Some radars detect and track space objects, such as space debris and satellites, primarily in Low Earth Orbit (LEO). Low Earth Orbit typically refers to distances from the Earth's surface to 2,000 kilometers away, but that is just an example with no limitation to that definition intended. Most satellites and the International Space Station operate in LEO, which makes tracking of debris and other objects even more important.

To improve detectability of the objects and measure them with high range and Doppler resolution, the desired operation would be integrated measurements of the space object over long periods of time. High Doppler resolution means that the radar can detect objects that travel relatively close together. In this context, long periods of time may run several hundreds of milliseconds or longer. These long periods of time conflict with the transmission limitations required to resolve the distance to the target, which may range from a few hundred to a few thousand kilometers.

Many radars have functional constraints, including pulse duration, duty cycle limitations, minimum transmission and/or reception periods, etc. Achieving the long periods of time for measurement integration for accurate tracking becomes difficult, if not impossible for some radars.

SUMMARY

One embodiment is a method of tracking objects using a radar, that includes sending a beamcode to at least one radar antenna to set a predetermined direction, using samples from a random distribution of at least one of a phase or an amplitude to generate a tracking signal pulse train, transmitting the pulse train from the at least one antenna within a pulse time window, receiving return signals from objects at the at least one antenna, and using the return signals to gather data to track the objects.

Another embodiment is a radar system having at least one radar antenna to transmit a tracking signal, a memory to store a set of random distributions, a controller connected to the at least one radar antenna and the memory, the controller to execute instructions to determine which random distribution to use, generate a pulse train using the random distribution, transmit the pulse train to the at least one radar antenna as the tracking signal, and gather measurement data about objects returning signals from the tracking signal.

DETAILED DESCRIPTION OF THE EMBODIMENTS

As used here, the term "radar" means any system used to perform radio detection and ranging. It may take the form of a parabolic reflector, planar array, phased antenna arrays, and other examples, having a transmitter and a receiver. An "antenna" consists of the radiating element or elements that radiate radio signals generated by the transmitter and receives radio signals and pass them to the receiver.

A "beamcode" is a signal sent to at least one antenna to provide a predetermined direction in which a transmission is to be sent. A "tracking signal" or "tracking transmission" is a signal sent by the antenna into the predetermined direction with the intent of receiving return signals from objects in free space into which the tracking transmission was sent. A "return signal" is a signal caused by the tracking signal reflecting off an object in free space and returned to the antenna.

The embodiments in here employ pulses sampled from uniform, random "distributions" as the tracking or transmitted signal. The random samples may also be referred to as a "code," or a "waveform." Some embodiments may use non-uniform, random distributions.

Figure 1:
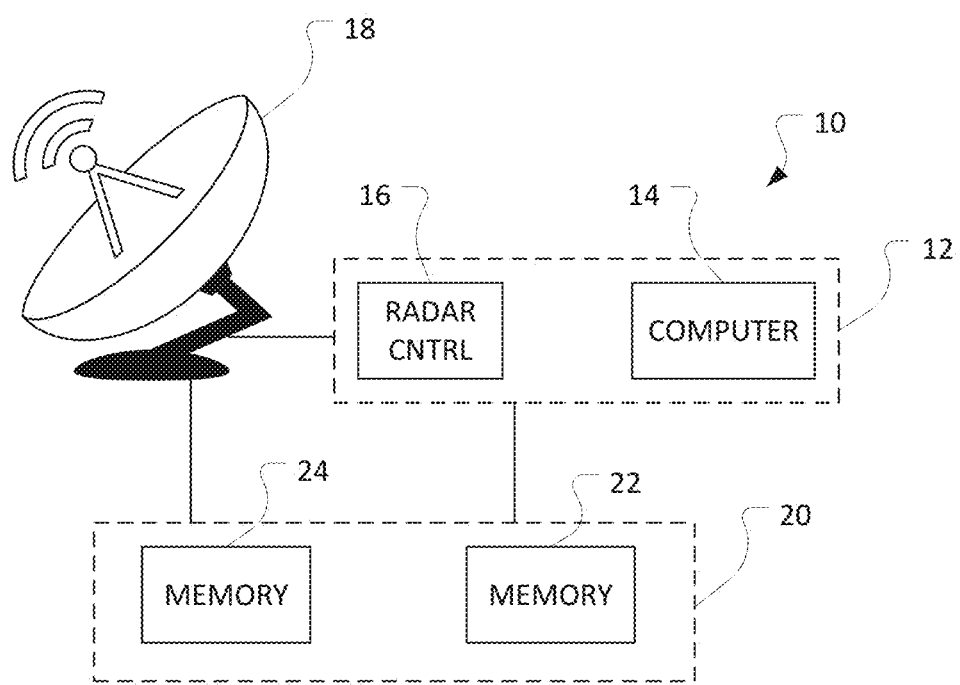
FIG. 1 shows a block diagram of a radar system.

FIG. 1 shows an embodiment of a radar system 10 usable with the methods and techniques discussed here. One should note that the elements here may have several different configurations but are shown in this arrangement for ease of discussion. The radar system has a controller 12, which may reside inside the radar transmitter, receiver, or a combined transmitter/receiver. The radar may consist of a phased array of antenna elements, where each element has its own controller, or the elements are divided into sub-arrays, each sub-array having a controller.

The controller may include dedicated control hardware or components 16 for controlling the antenna array and transmitter/receiver, and a separate computer 14 for selection of random distributions used by the embodiments here. The radar control and the computer may reside in the same device, or separate devices, within the system. Similarly, the embodiments here use random distributions that may be stored in a memory such as 20. These may be stored in a separate memory 22 from the memory used for transmission and reception 24, or they may share a common memory.

Typically, radars used for tracking low earth objects generate a series of periodic pulses sent into space. As will be discussed below, different radars have different performance parameters. Examples of radar systems with the specific performance parameters will be given below, but performance parameters may include a maximum pulse width, a minimum pulse width, duty cycle, beamcode times, beamcode wait times, transmit/receiving padding, individual pulse length, interpulse period (IPP), among others.

In one example, a typical pulse may have a duration between 10 microseconds and 2 milliseconds. In current radars, one pulse is sent during that time, and several pulses are integrated over several pulse widths to allow reception of a number of return signals to provide accurate tracking. In contrast, the embodiments here use a pulse train transmitted according to a uniform, random distribution. This allows multiple pulses of received returns to be integrated.

Figure 2:
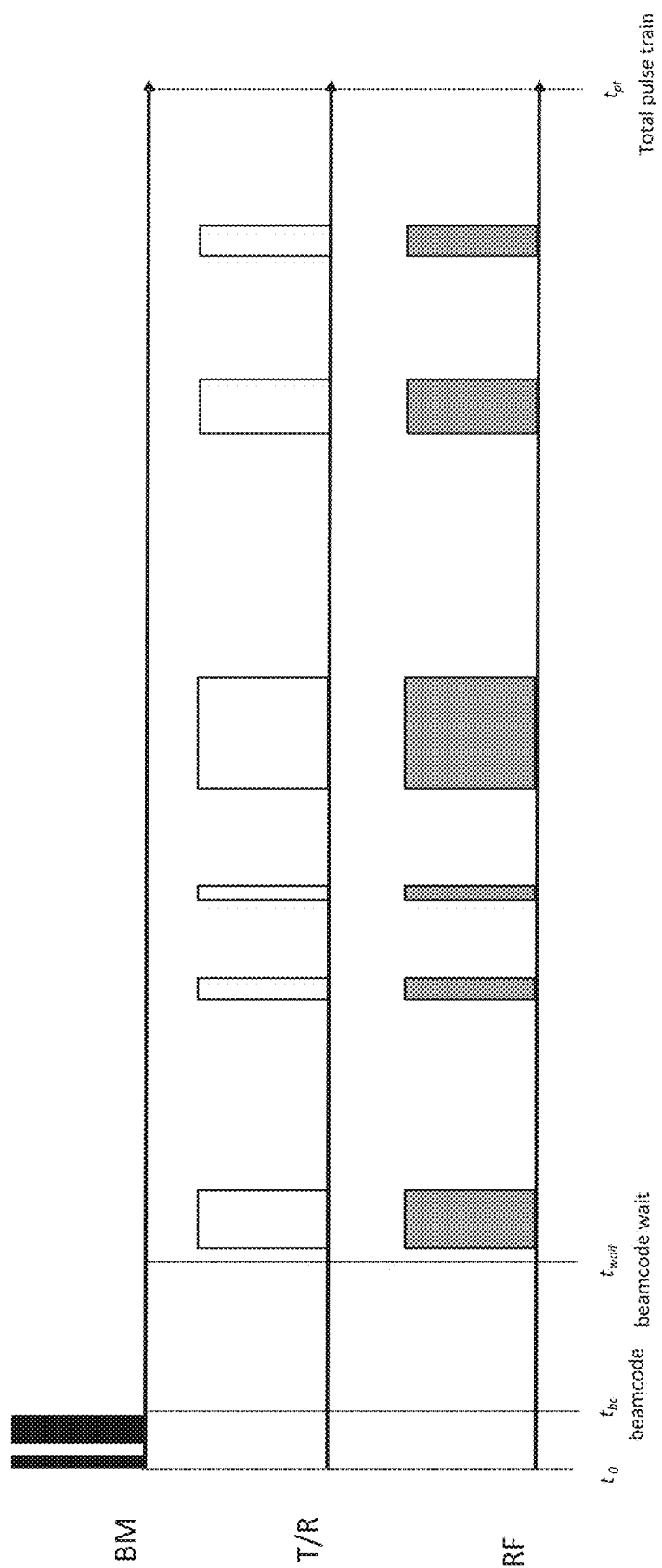
FIG. 2 shows a timing diagram for a pulse train transmission for tracking.

FIG. 2 shows an example of such a pulse train. The top line shows the beamcode transmission. Each beamcode corresponds to a single look direction. In FIG. 2, the beamcode BM is transmitted at the beginning of the pulse interval, $t_0$ until the end of the transmission time, $t_{beamcode}$. There is then a wait time between $t_{beamcode}$ and $t_{wait}$ while the beamcode is processed. A pulse train is then sent between $t_{wait}$ and the end of the pulse train interval $t_{pt}$. The pulse train interval may also be referred to as the pulse train window.

The pulse train results from a uniform, random distribution, either in pulse length or amplitude or both. In the example of FIG. 2, each pulse has constant amplitude but is coded with a phase drawn from a uniform random distribution (not shown), typically polyphase. Individual pulse length and IPPs are also drawn from the random distribution.

Figure 3:
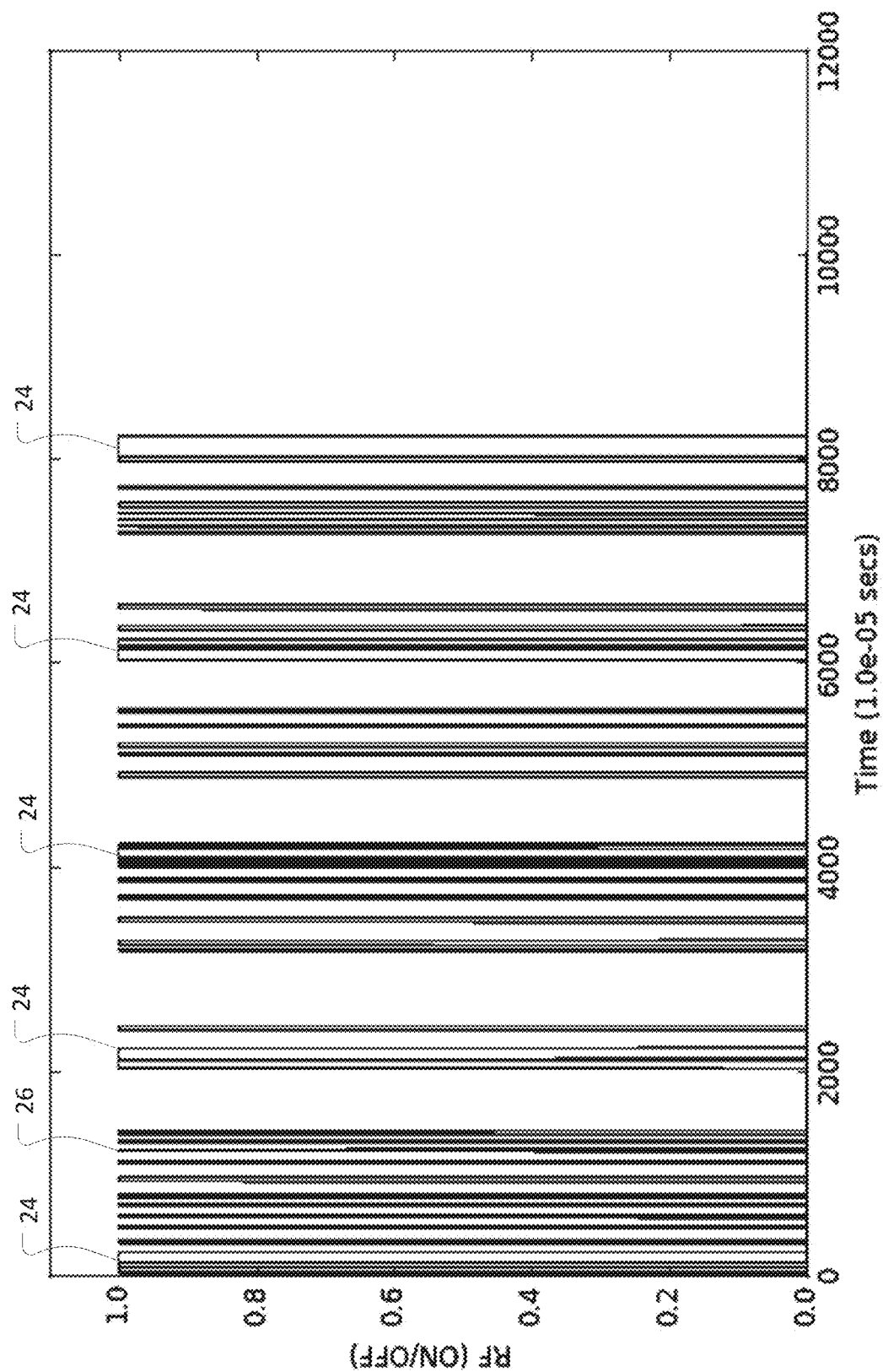
FIG. 3 shows a diagram of an embodiment of a waveform compared to a current waveform.

FIG. 3 shows a comparison between a traditional waveform shown by pulses 24 and the pulse train, shown by the varied pulses such as 26. The traditional waveform used as an example here has a 2 millisecond pulse with a 20 millisecond IPP. The waveform shown by the randomized pulses such as 26 is the RF waveform. Within the transmission envelope, it is coded with a random polyphase code (not shown).

Figure 4:
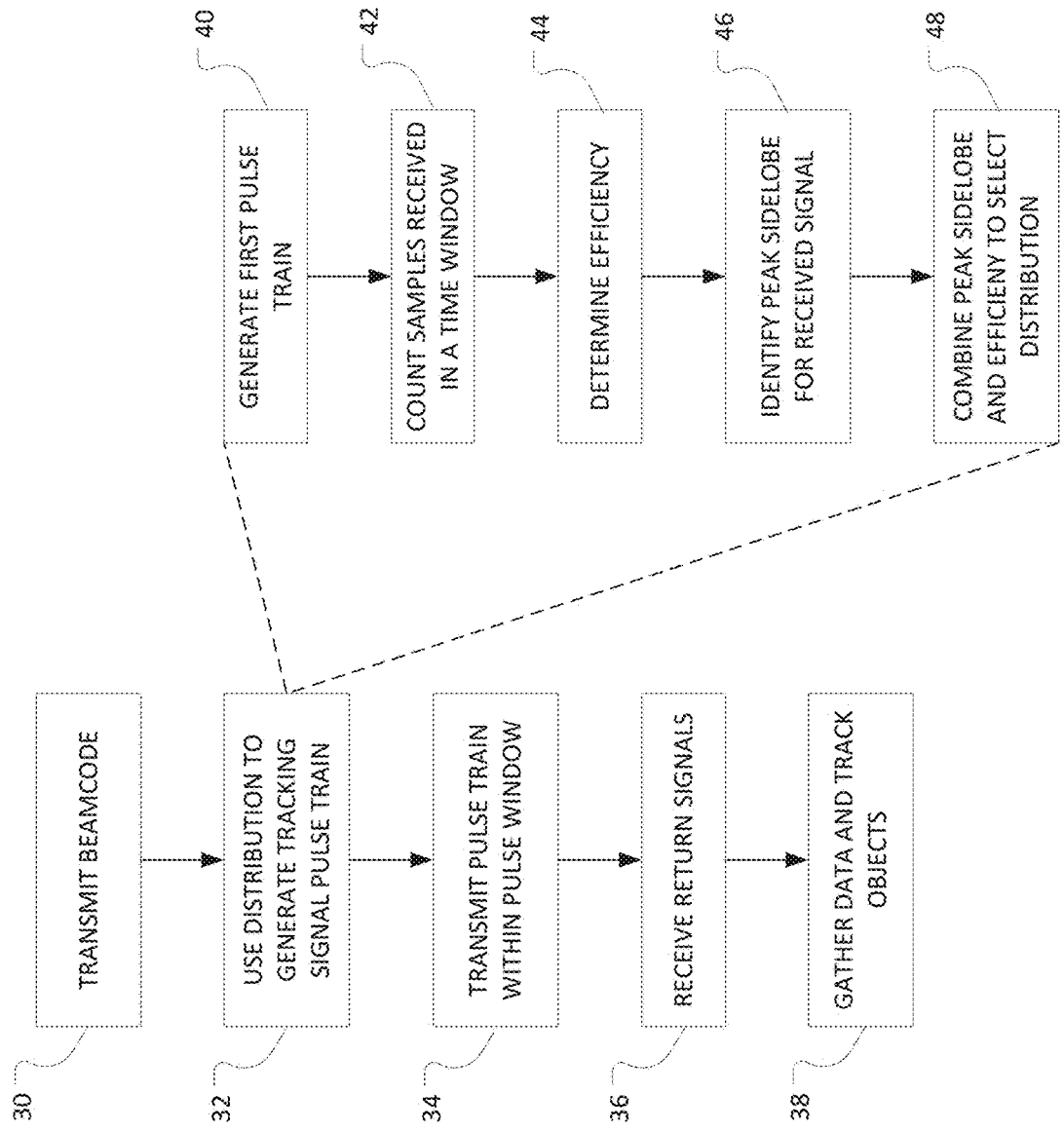
FIG. 4 shows a flowchart of a method of transmitting tracking transmissions as pulse trains.

FIG. 4 shows an embodiment of a process of generating the pulse train and the selection of random samples. The main flow of the process relates to the generation of the pulse train. At 30, the beamcode for a predetermined single look direction is transmitted to the antenna to cause the antenna to orient itself into the proper direction, which can be done with either electronic, as in a phased array, or mechanical steering, as in a moveable antenna. At 32, a uniform, random distribution is used to generate a tracking signal pulse train such as the one shown in FIGS. 2 and 3. The radar transmits the pulse train at 34 and receives the return signals at 36. The reception occurs continuously throughout the process. By using the random code to vary the phase of the transmission signal, the received signal from each pulse can be distinguished from each other. In current systems, an ambiguity exists between the signal from one transmit pulse at one range and the signal from another transmit pulse at another range. This is referred to as range-aliasing. By randomly phasing each transmit pulse, the system can deduce that a returned signal with that same pattern came from that transmission, removing all range-ambiguity.

The random samples are selected based on examination of the waveform sidelobes. At 40, the process generates a pulse train. For example, the process may generate a set of random pulses within the minimum and maximum pulse lengths, a set of random duty cycles within a minimum and maximum duty cycles, and use these to form a pulse train.

Figure 5:
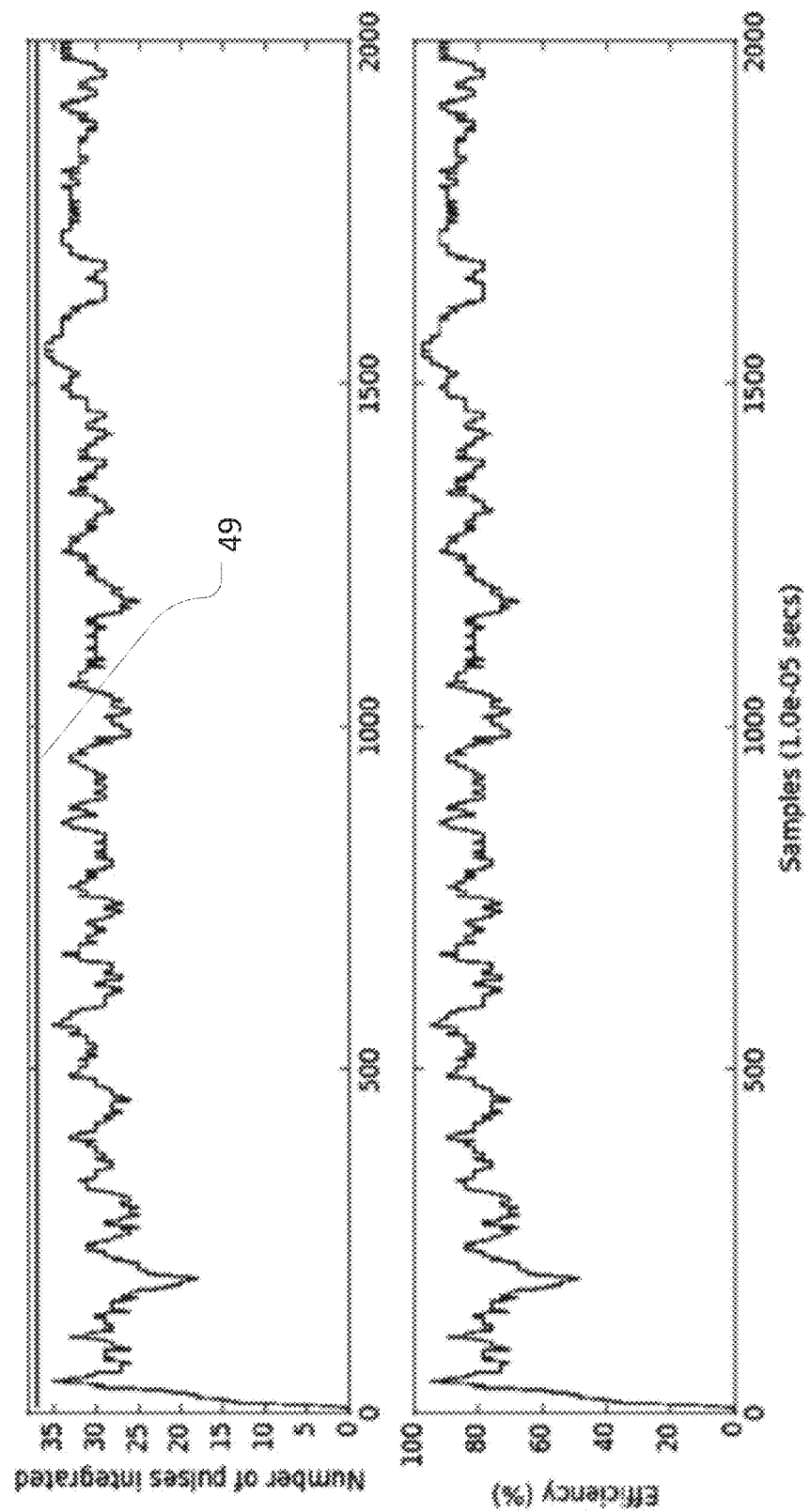
FIG. 5 shows a graph of a number of pulses integrated over time against a graph of efficiency for a pulse train.

At 42, a number of samples in the receiving time, or window, that are unusable due to transmitting is determined. A transmitting signal will saturate any received signal that falls within the transmit window of the transmitting signal. This results in an efficiency measure that equals the number of usable samples divided by the total number of samples. This is then used to determine the efficiency of that pulse train previously generated. FIG. 5 shows an example of the efficiency of a waveform. The top graph shows the number of pulses integrated as a function of the relative sample time, which corresponds to the time-of-flight to a target. The solid line 49 shows the ideal case, if all pulses were integrated. As shown in the bottom graph, the ratio of the number of pulses integrated to the number of pulses transmitted corresponds to the efficiency percentage in the lower graph. The embodiments here result in an efficiency of 80-90%, meaning that at a given time-of-flight (range) 80-90% of the samples can be integrated for measurement of the target.

Returning to FIG. 4, the process then determines the peak sidelobe level at 46. Generally, this determination occurs based upon the largest sidelobe in frequency space.

The efficiency measure and the peak sidelobe level will define a metric at 48. The metric attempts to maximize the efficiency while minimizing the peak sidelobe level. Using this metric, the process chooses the code with the best metric in one embodiment. Another embodiment may define a desired efficiency and find the distribution that matches that efficiency. Multiple iterations may occur until the desired efficiency is achieved. The resulting code, or distribution, that meets the criteria established as the desired characteristic, will then be used to generate the transmission pulse train. A variety of search methods may be used to find the optimal transmission sequence for a given application.

Figure 6:
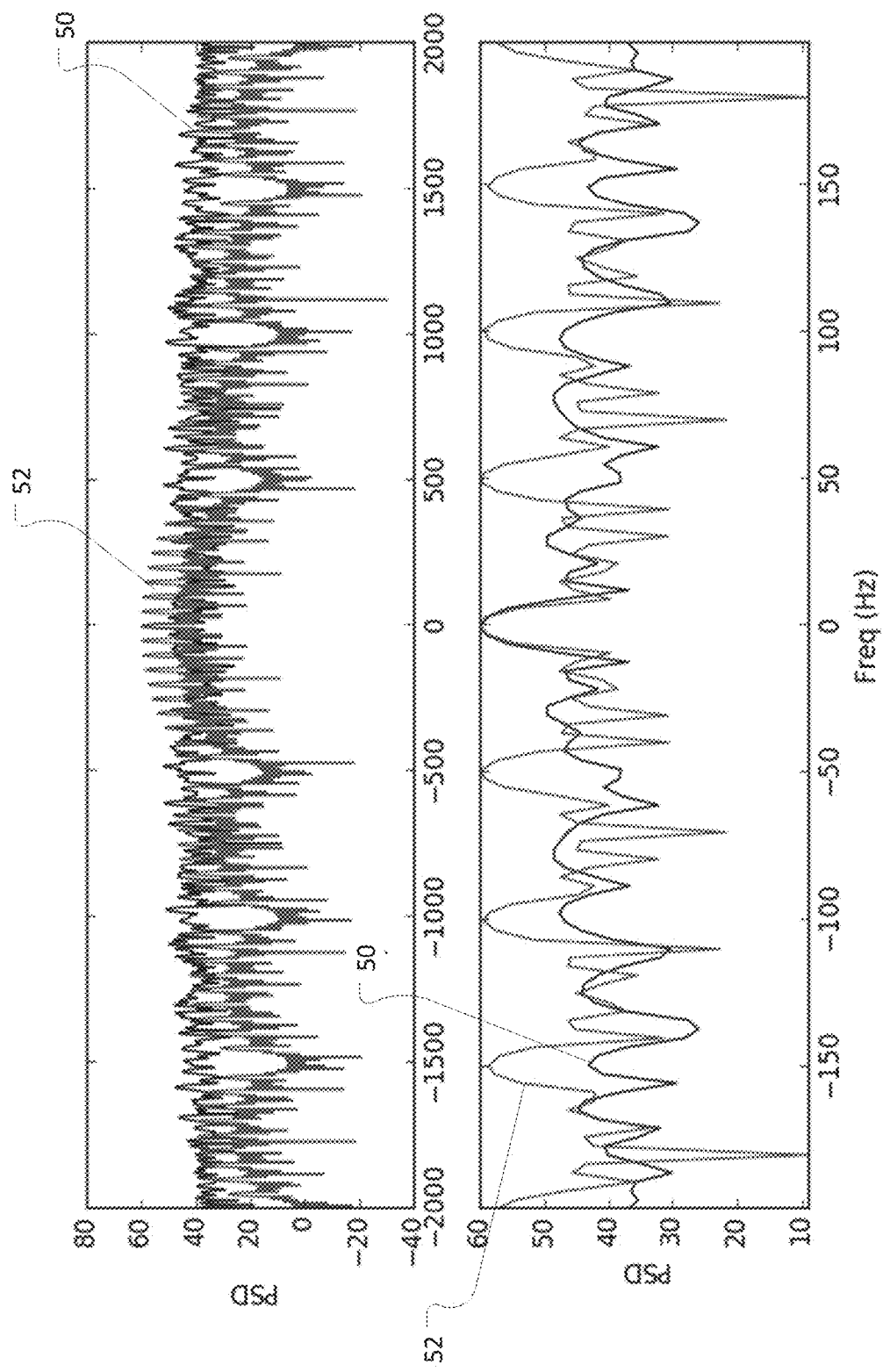
FIG. 6 shows a graph of a power spectral density of a tracking pulse train against a graph of an expanded view or a portion of the power spectral density.

In another embodiment, other parameters of the pulse train may be used to define a metric. These parameters may include, but are not limited to, the integrated sidelobe level, the main lobe width, and the total power in the main lobe Using the embodiments here, the Doppler ambiguity caused by transmitting a regular sequence of pulses is reduced. FIG. 6 shows a comparison of the power spectral density of a currently-used waveform, and a waveform using the embodiments discussed here. The top graph has a scale that is 100 times the scale of the bottom graph, and provides a wider view of the comparison. In the top graph, the traces 50 result from the embodiments discussed here. The traces 52 result from the traditional constant pulse length that has a pulse length time, and IPP.

As shown in the lower graph, with a lower scale one can see that the signal 52 has predictable Doppler sidelobes occurring at every 50 Hz (1/IPP) or every 17 microseconds. This causes severe ambiguity, meaning that it is difficult to resolve which velocity peak the target is moving at. In the signal traces 50, the signal randomizes the sidelobes. This allows for approximately 13 dB of Doppler discrimination. The Doppler resolution, or width of the mainlobe, is barely affected. This is determined by the total integration time (1/100 millisecond=3.35 microseconds).

As mentioned above, the embodiments here may be applied to any radar architecture and any set of system parameters. However, for ease of discussion and understanding, two different examples are provided here. A first example has the following operating parameters. The center frequency resides at 440 MHz, but is adjustable as needed. The beamcode message is 16-bits with a first bit that is always high, and each bit is 2 microseconds for a total duration of 32 microseconds. The beamcode wait time is 400 microseconds, the system waits 400 microseconds after beamcode transmission. The transmission from the power waveform to the radio frequency (RF) involves delays, so the system requires transmit and receive padding. In this embodiment, a lead pad consists of a 2 microsecond at the beginning of each transmit and receive interval. This ensures that the transmit/receive arrives before the RF. The trailing pad is 10 microseconds at the end of each interval. This ensures that the RF signal before gating turns off.

The individual pulse length is drawn from the random distributions discussed above, in this example the range is from 100 microseconds to 500 microseconds, but can be adjusted anywhere within the transmit limits. The duty cycle for each pulse is drawn from a distribution, and may range from 5% and 20% while trending towards an average duty cycle of 10%. These values could be adjusted within the range of the solid-state power amplifier (SSPA) subject to performance limits. The baud length, the baud duration within a pulse, is nominally set at 0.5 microseconds, 2 MHz, but could be increased. The phase for each baud is drawn from the random distribution of the entire unit circle. Alternatively, a binary phase could also be used.

The pulse train duration is set by the maximum integration time desired for a single look direction. Nominally, this is set at 100 milliseconds for this particular embodiment, but can be adjusted. This time also determines the nominal Doppler resolution, a 100-microsecond integration time gives a 10 Hz (3.3 m/s) Doppler resolution. A non-transmit receive window can be left at the end of the pulse train, which should correspond to the maximum range desired. In one embodiment, this is set at 20 milliseconds. The average RF duty cycle over an entire pulse train should not exceed the SSPA limits, around 10% dependent upon current and temperature.

In another embodiment, the center frequency is approximately 2950 MHz. The beamcode message is 16 bits, at 1 microsecond, for a total duration of 16 microseconds. The beamcode waiting time takes 20 microseconds. The lead transmit/receive padding is 2 microseconds, and the trail pad is 2 microseconds. The individual pulse length is a random distribution between 100 to 500 microseconds, adjustable as needed. Generally, longer pulses are better for unambiguous range measurements and reduced short-range clutter but shorter pulses are better for Doppler measurements and decoding.

The duty cycle random distribution ranges from 10% to 30% but trends toward an average duty cycle of 10%. The baud duration within a pulse will be set at 0.25 microseconds (4 MHz), but can be increased. As before, the pulse train duration is set by the maximum integration time desired for a single look direction. This is initially set at 100 milliseconds, but is adjustable. A 100-millisecond integration time gives a 10 Hz (0.5 m/s) Doppler resolution. Similar to the embodiment above, the limits of SSPA, determined by current and temperature.

In this manner, a radar can transmit pulse trains in the place of the single pulses currently being used. This increases the efficiency of the radar and provides better resolution than current radars by reducing the Doppler ambiguity.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of tracking objects using a radar, the method comprising:
    sending a beamcode to a radar antenna to set a predetermined direction;
    using samples from a random distribution of at least one of a phase or an amplitude to generate a tracking signal pulse train;
    transmitting the pulse train from the radar antenna within a pulse time window;
    receiving return signals from objects at the radar antenna; and
    using the return signals to gather data to track the objects, wherein at least one of:
        (a) wherein using a random distribution comprises: generating a first pulse train; counting a number of samples in a receive time window for the radar that are unusable due to transmitting to produce an efficiency of the first pulse train; determining a largest sidelobe in frequency space for the received signals to identify a peak sidelobe; combining the peak sidelobe and the efficiency to produce a metric; and using the metric to select a distribution to be used, or
        (b) wherein using a random distribution comprises: generating a first pulse train; determining a parameter of the pulse train using the parameter to produce a metric; and using the metric to select a distribution to be used.

2. The method of tracking objects of claim 1, further comprising having a wait time after sending the beamcode to allow for beamcode processing at the radar.

3. The method of tracking objects of claim 1, wherein using a random distribution comprises: generating a first pulse train; counting a number of samples in a receive time window for the radar that are unusable due to transmitting to produce an efficiency of the first pulse train; determining a largest sidelobe in frequency space for the received signals to identify a peak sidelobe; combining the peak sidelobe and the efficiency to produce a metric; and using the metric to select a distribution to be used.

4. The method of claim 1, wherein the random distribution is applied to a phase of the tracking pulse train.

5. The method of claim 1, wherein the random distribution is applied to an amplitude of the tracking signal pulse train.

6. The method of claim 1, wherein the random distribution is applied to a phase and an amplitude of the tracking pulse train.

7. The method of claim 1, wherein the pulse train is adapted to occur within a duty cycle constraint.

8. The method of claim 1, wherein the pulse train is adapted to occur within a pulse length time.

9. The method of claim 1, wherein the random distribution is one of uniform or non-uniform.

10. The method of claim 1, wherein using a random distribution comprises: generating a first pulse train; determining at least one parameter of the pulse train using the at least one parameter to produce a metric; and using the metric to select a distribution to be used.

11. The method of claim 10, wherein the at least one parameter includes one of an integrated sidelobe level, a main lobe width, and a total power in the main lobe.

12. A radar system, comprising:
    a radar antenna to transmit a tracking signal;
    a memory to store a set of uniform, random distributions;
    a controller connected to the radar antenna and the memory, the controller programmed to execute instructions to:
        determine which random distribution to use;
        generate a pulse train using the random distribution;
        transmit the pulse train to the radar antenna as the tracking signal; and
        gather measurement data about objects returning signals from the tracking signal.

13. The radar system of claim 12, wherein the controller comprises a computing device connected to a radar controller.

14. The radar system of claim 12, wherein the radar antenna is one element of a phased array of elements.

15. The radar system of claim 14, wherein each element of the phased array has a controller.

16. The radar system of claim 14, wherein the elements of the phased array of elements are divided into sub-arrays, each sub-array having a controller.

* * * * *